United States Patent [19]

Moore

[11] 4,050,978
[45] Sept. 27, 1977

[54] METHOD FOR PRODUCING LIGHT-WEIGHT CONSTRUCTION MEMBER

[76] Inventor: Alvin Edward Moore, Manini Way, Diamondhead, Rte. 1, Bay St. Louis, Miss. 39520

[21] Appl. No.: 569,922

[22] Filed: Apr. 21, 1974

Related U.S. Application Data

[63] Continuation-in-part of Ser. No. 359,800, May 14, 1973, Pat. No. 3,878,661, which is a continuation of Ser. No. 102,317, Dec. 29, 1970, abandoned.

[51] Int. Cl.$^2$ .................. B32B 5/18; B29D 27/00; B28B 23/00
[52] U.S. Cl. ..................... 156/300; 156/78; 156/242; 264/46.5; 264/46.7; 264/46.9; 264/135; 264/255; 264/256; 264/261; 264/263; 264/DIG. 57
[58] Field of Search ............ 264/46.5, 71, 255, 256, 264/261, 338, 253, 259, 274, DIG. 57, DIG. 63, 46.7, 46.9, 135, 263; 52/577, 382, DIG. 9; 156/78, 79, 242, 300

[56] References Cited

U.S. PATENT DOCUMENTS

| | | | |
|---|---|---|---|
| 584,875 | 6/1897 | Jameton | 52/577 X |
| 1,234,244 | 7/1917 | Willsie | 264/253 |
| 1,465,653 | 8/1923 | Olander | 52/577 X |
| 1,477,520 | 12/1923 | Pittman | 52/DIG. 9 |
| 2,946,158 | 7/1960 | Seipt | 264/259 X |
| 3,328,932 | 7/1967 | Cheskin | 52/577 X |
| 3,381,066 | 4/1968 | Lowe | 264/71 |
| 3,507,738 | 4/1970 | Pusinski | 264/71 X |
| 3,839,519 | 10/1974 | Weiner | 264/46.5 |

FOREIGN PATENT DOCUMENTS

| | | | |
|---|---|---|---|
| 254,474 | 5/1967 | Austria | 52/577 |
| 1,105,738 | 12/1955 | France | 52/DIG. 9 |

*Primary Examiner*—Thomas P. Pavelko
*Attorney, Agent, or Firm*—Alvin E. Moore

[57] ABSTRACT

A contruction member, usable in exterior or interior walls, ceilings or floors, including: a stiff, planar, can-supporting panel or board; cylindrical or otherwise non-rectangular, parallel-axes cans having end covers fixed to the panel or board, these cans being preferably of metal but optionally of dense, strong plastic or glass, of the new or used type, having lengths that are less than twelve times their diameters; optional insulation inside the cans; large-mesh metal or plastic fencing, fixed to can ends; and porous, insulating, strength-providing adhesive material around portions of the can sidewalls, bonding and bracing the cans together into a bar, panel or block, part of this material being in layers within recesses of the can-end covers that are spaced from the panel or board. The cans may be sealed or opened at one end; and the gaseous material in them may be air or other gas, or mixed gas and insulation, such as low-cost cinders or ashes, preservative treated bits of cotton or linters, charred sawdust, tanbark, bits of bark sold as mulch, vermiculite, foamed plastic, bits of rockwool, or the like. The porous, adhesive, insulating material around the cans may be poured thru the large mesh of the fence-type fabric into the spaces between portions of the can sidewalls. The part of it that lodges in the porous, insulating, stucco-holding layers in recesses of the upper can-end covers may be leveled off by a tool with an elongated straight edge. The portion of this material which lies between can-sidewall portions has a depth less than the lengths of the cans, so that after it has set and the construction member is removed from the mold it may be transported to a building site, and there joined with other, similar articles in a wall comprising wall-finishing material; for example stucco may be troweled or sprayed onto it, penetrating spaces between can sidewalls in tongues and adhering to the layers of porous material that are in recesses of can-end covers. The invention comprises a method of making the contruction members.

6 Claims, 10 Drawing Figures

METHOD FOR PRODUCING LIGHT-WEIGHT CONSTRUCTION MEMBER

This application is a continuation in part of application Ser. No. 359,800, filed on May 14, 1973, now U.S. Pat. No. 3,878,661, which was a continuation of application Ser. No. 102,317, filed on Dec. 29, 1970, now abandoned, and includes a method, claims to which were divided from the prior application.

This method and the resulting structure have been improved in the present invention and application.

Some of the objects of the present invention are to provide: (1) a light-weight, insulating construction member comprising a planar base, cans on the base that contain gaseous material and have around them insulating molded material which for example may be porous concrete or foamed plastic; (2) a construction member as in (1) above, including large-mesh, fence-type fabric, fastened to can-end covers that are spaced from the planar base; (3) a wall comprising a plurality of construction members of any of the above types and means fastening the members together; and (4) a method of making a light-weight, insulating, strong, inexpensive, can-comprising construction member. These and other objects of the invention are indicated in the attached drawings and the following specification.

Figure 6:
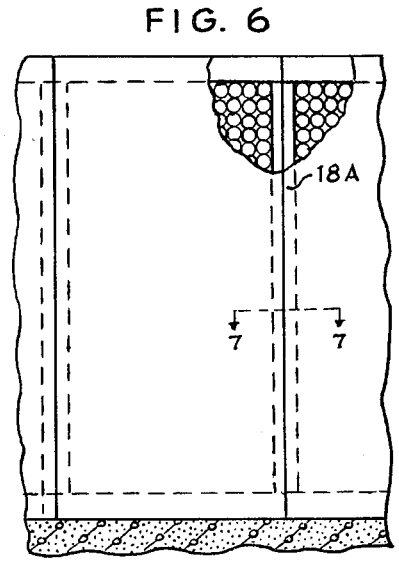
Figure 7:
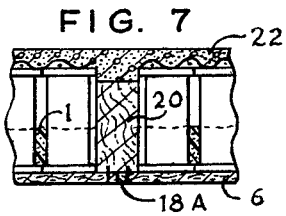
Figure 8:
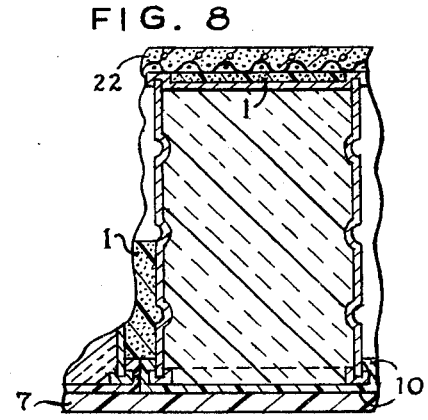
Figure 9:
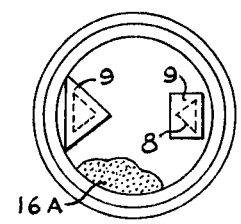
Figure 10:
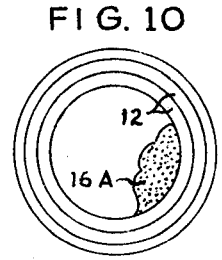

FIG. 6 may be considered as an elevational view of panels of the invention joined in an upright wall or a plan view of the panels in a ceiling or floor, part of the figure being broken away to illustrate cans and adjacent to a scantling or stud to which the panels are attached;

FIG. 7 is a sectional detail view from the lane 7—7 of FIG. 6;

FIG. 8 is a fragmentary view in section across a construction member utilizing used cans of the currently common coffee-containing type, preferably containing insulation;

FIG. 9 is a plan view, partly broken away, of another common type of used can, optionally usable in the invention, shown as optionally containing insulation and having sealed-over openings; and FIG. 10 is a plan view of another type of new or used can, the figure being partly broken away to illustrate can-contained insulation.

In each of the construction members illustrated in FIGS. 1 to 8 and described below: the molded, can-holding, porous, insulating, adhesive material 1 may be foamed plastic or a mixture of cement (for example, formica cement, epoxy, asphalt rubber cement, or mortar cement — mixed portland cement and lime) and porous granulated or fine materials (for example, vermiculite, ground or shredded foamed plastic scrap, cinders, charred sawdust or bits of expanded shale ("Haydite") or expanded baked clay); and the cans preferably are of metal, but optionally may be of dense, strong plastic or of glass (jars of bottles). Preferably the cans utilized are of a standard, commercially procurable type; and preferably their lengths are less than three times their diameter. The layer of can-bracing material 1 between can sidewalls has a thickness (depth) that is at least one inch and preferably is at least equal to a third of the height of the cans.

Figure 1:
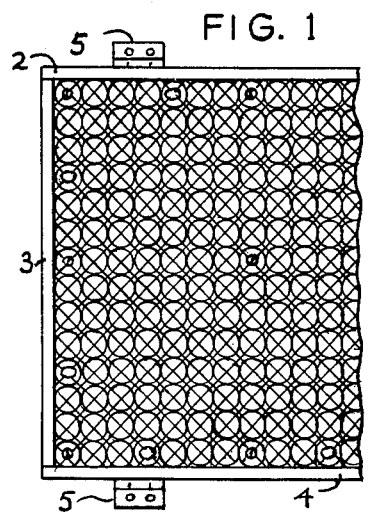
FIG. 1 is a plan view, partly broken away, showing a plurality of fabric-reinforced, parallel-axes cans in a mold or rack before the fluent mixture of plastic materials is inserted into the mold.
Figure 2:
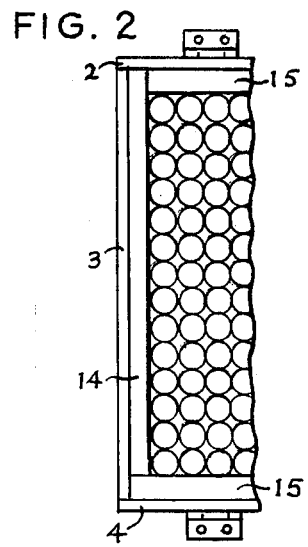
FIG. 2 is a fragmentary plan view of a set of the cans on a planar element and within a mold, showing filler bars between the cans and mold sides, providing for attachment flanges in the resultant can-containing panel.

The mold illustrated in FIGS. 1, 2, 4 and 5 comprises four upright-wall elements, of which only three are shown in FIGS. 1 and 2, at 2, 3 and 4. The walls 2 and 4 are illustrated as hinged to a mold bottom or floor slab or the like by the hinges 5; and the element 3 and the similar wall element that is parallel to 3 are fixed to the floor or mold bottom. The elements 2 and 4 are releasably fastened to the wall 3 and to the similar parallel wall by hooks and eyes or other fastening elements (not here shown).

The construction members shown in FIGS. 3 to 8 are formed in the mold of FIGS. 1, 2, 4 or 5 in a method which basically comprises the following steps:

1. At the bottom of the mold there is placed a can-supporting, substantially planar element, which optionally may be the piece of plywood or plank shown at 6 in FIGS. 4, 5 and 7, the stiff plastic sheet 7 of FIG. 8 (preferably porous), or a sheet of metal, concrete or gypsum board.

2. On top of this element cans are placed with their axes parallel and upright. These cans have hollow sidewalls and, fixed to these sidewalls: upper can-end plates having upwardly-open recesses; and lower can-end elements that rest on the can-supporting element. The cans may be either new or of the used type having openings in ends of the cans. If new they may be sealed and may contain gas (air or helium), optionally mixed with insulating material, which optionally may be of any known type of thermal insulation. If they are used cans they also optionally may contain insulation, in which event holes 8 in their ends preferably are sealed over (by pieces of adhesive tape 9, plastic can caps of the type shown at 10, or lids 12 of cans of the paint-containing can type. If used cans of the liquid-containing type are utilized, each having a hole or holes in one of its end caps, and no easily pourable insulation is in the cans, their hole-containing ends may be turned downward to prevent the porous-plastic molding material from entering the cans thru the holes where they have been opened, for example as beer or soft-drink cans. Inside the mold, as illustrated in FIGS. 1 and 2, the cans are positioned in orthogonally arranged rows; but, alternatively, they may be staggered as is optionally indicated in FIG. 1 of prior application Ser. No. 359,800. An optional part of this method step (1) is: coating the planar can-supporting element with formica cement, asphalt, or other adhesive material and placing the lower can caps on this material before it sets. This adhesive between the lower can-end plates and the can-supporting element strengthens their interrelationship, and holds the cans in stable arrangement during the application of moldable material.

3. Reinforcing, large-mesh fabric, having mesh sufficiently large for passage of moldable material thru it (for example, of the poultry-fence-wire type) is fastened by screws (rod-like elements) and/or epoxy to upper can-end covers. These screws or the like are means holding at least portions of the network in close contact with upper can-end plates.

4. The molding material 1 - a mixture of foam-plastic liquids or cement and porous, insulating aggregate (for example, Formica, epoxy, portland or mortar cement and porous light-weight aggregate, such as expanded shale or clay, pumice or small globules of foam plastic), in fluid condition-is poured or injected thru the relatively large mesh of the reinforcing fabric. This material, which flows thru the spaces between the can sidewalls and settles to a height that preferably is less than the length of the cans, serves several purposes: it fastens the cans securely to each other and to the can-supporting planar element; it braces the cans and strengthens the construction member without making it too heavy for easy handling; due to its porosity it provides substantial thermal insulation; and the portion of it which remains in can ends strengthens these ends, and provides insulating porosity at these ends.

5 An elongated, trowel-like, thin-edged bar, having a length at least equal to the width of the mold, may be operated manually by two workmen or by a machine to sweep over the top of the cans, substantially leveling the molding material resting in the recesses of the upper can-end caps to the plane of the top parts of the cans, raking the surplus molding material into the spaces between can sidewalls. This is an optional method step.

6. The molding materials are allowed to set into firm, insulating material.

7. The hooks or other fastening devices that hold mold walls 2 and 4 against the other two walls are released; these walls 2 and 4 are hinged downward; and the construction member is taken from the mold.

Figure 3:
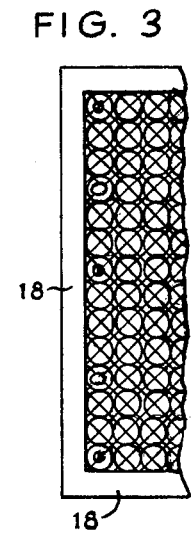
FIG. 3 is a plan view, partly broken away, of the type of construction member made in the mold of FIG. 2.
Figure 4:
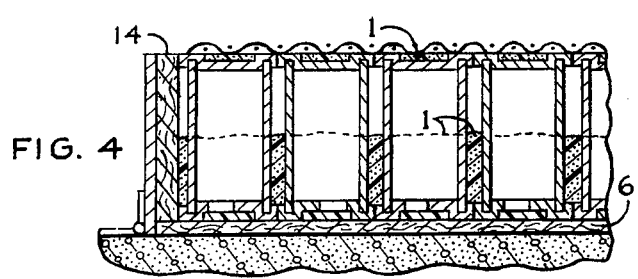
FIG. 4 is a view in section from a vertical plane thru a construction member of the invention.

An optional additional step in the above-described method is indicated in FIGS. 2, 3 and 4. This step, between steps (1) and (2), comprises placing within the four walls of the mold four filler bars 14, 15 which may be of hollow metal or plastic but are shown in FIG. 4 as wooden boards, having a height equal to that of the cans. For ease of separation from the material 1 after it has set from previously plastic, adhesive condition, at least the can-juxtaposed inside surface and the top edge of each of these filler pieces optionally may be sheathed by teflon. This may be applied in liquid form, but preferably it comprises thin sheets of teflon, glued to the wood or other material of the filler pieces 14 and 15 by a known type of cement which adheres to teflon. Optionally the bars 15 may be epoxy-glued to the hinged mold walls 2 and 4; and optionally the bars 14 also may be thus cemented to the mold walls 3; and in this event: the top teflon strips or coatings which sheathe the top edges of 14 and 15 also extend over the upper edges of the walls 2 and 3; and the walls 3, like 2 and 4, are hinged to the mold bottom. (When such filler strips are not used in the mold its interior surfaces and upper edges preferably are thus sheathed in teflon.)

Figure 5:
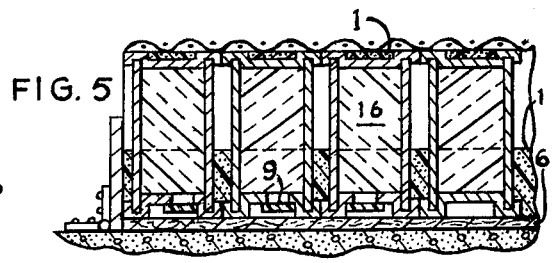
FIG. 5 is a sectional view, similar to FIG. 4, showing a construction member in which the cans contain insulating material.

Sealed or dead-air spaces of small volume provide good thermal insulation. Therefore, when the cans are small - for example ten-ounce or twelve-ounce beer or soft-drink cans - they are not necessarily filled with porous insulation, especially in view of the fact that the dead-air-space insulation of common metal cans is augmented by the insulating value of their bright inside metallic surfaces. The twelve-ounce cans have a height of approximately 4 3/4 inches and a diameter of approximately 2 inches, thus providing substantial dead-air insulation in small confined spaces. Nevertheless, and as indicated in FIG. 5, these smaller cans optionally may be filled with porous insulation, 16; and the larger cans preferably are thus filled. This thermal insulation may be of low cost because it is canned; and for easy filling of cans it is preferably granular or in small bits — for example, easily pourable charred sawdust, vermiculite, ashes or dust, cotton linters, bits of bark commercially sold as mulch, ground bark, cottonseed or rice hulls, very small bits of rockwool - or, if lightness of weight is not especially important, sand, or a wet mixture of sawdust and clay (heated after filling of the cans), or a mixture of powdered dry clay and charred sawdust. When charred sawdust is used it is of course heated in little or no air. This insulation, preferably in small bits as indicated at 16A in FIGS. 9 and 10, may be poured into the cans after their assembly in the molds, and optionally before application of the wire or plastic mesh, via gang funnels, continuously connected together at the apertured bottom of a metallic or plastic pan.

In addition to the insulation of the cans and their contents, the invented construction member has insulation in: the plywood or other porous can-backing element 6; the porous-plastic molding material 1 (in the spaces between can sidewalls and in the layer of this material in the recesses of those can ends to which the reinforcing mesh is attached); and the porous first coat or coats of the optional finishing stucco.

The construction member without attachment flanges, as indicated in FIGS. 1 and 5, may be assembled in a wall — for example in an inside partition without masonry backing or in an outer wall part by gluing its edges to juxtaposed similar edges of other, similar construction members and to floor or roof-supporting elements with epoxy putty or other strong adhesive.

But the preferred construction member shown in FIGS. 2 to 4, 6 and 7 has attachment flanges, 18. These flanges have been provided for in the mold due to the fact that the filler pieces 14 and 15 have left four borders around the cans that are devoid of cans and the adhesive material 1. During pouring of the moldable material these pieces prevent application of this material on the borders of the preformed, planar, can-backing element; and when the filler pieces are removed from the mold after the moldable material has set there are uncovered portions of the can-backing element at the flanges 18, facilitating nailing or otherwise fastening of the flanges to studs or the like.

FIGS. 6 and 7 illustrate a wall or wall part utilizing construction members of the invention. The invented panel has a height equal to that of the desired room or porch and a width, preferably in the neighborhood of four feet, which is at least equal to the width taken up by the horizontal rows of cans plus the width of the two side attachment flanges 18. The studs 20, of wood or plastic, are spaced apart at their centers by a distance equal to this width of the construction member; and the two side flanges 18, the width of which is shown as enlarged in FIG. 3, are nailed and/or glued to edges of a spaced pair of the studs 20. Preferably each of the side flanges (18A) has a width at least equal to half of the thickness of the studs, and each of the top and bottom flanges has a width at least equal to that of the wall plates and wall-base boards. Thus, these panel-supporting boards are entirely covered by the flanges. Optionally, standard 4 × 8 foot plywood pieces may be used in making the construction members; and in this event each of the attachment flanges (18) may be wider than half of the thickness of the studs or other scantlings.

Preferably, the thickness of the studs, wall plates and wall-base boards is that of standard "2-inch" lumber — that is, approximately 1 ¾ inches. When the cans (preferably used) are of the 10-ounce or 12-ounce beer or soft-drink type, approximately 4 ¾ inches high, the breadth of the "two-by-four" studs, wall plates and wall-base boards (3 ¾ inches) is approximately one inch less than the length of the cans; and when the cans are of the 14-ounce type (5 9/16 inches long) the breadth of the "two-by-six" studs, wall plates and wall-base boards is approximately 3/16 inches less than the can length. Thus, in either event, there is a space at an edge of each stud to be filled over by finishing stucco or the like. In this space a narrow strip of expanded-metal lath or the like optionally may be nailed, before application of stucco.

This stucco, 22, or similar material comprises cement (portland, mortar, epoxy or other cement) and fine aggregate (for example, sand, cinders, granular baked clay or expanded shale, vermiculite, ground or shredded plastic, pumice, or the like). Preferably a first coat of the stucco includes vermiculite, cinders or other porous aggregate (thus providing extra thermal insulation), and the second coat includes sand as aggregate. The wall is then finished by at least two coats of "STA-DRI," "BONDEX" or other waterproofing paint.

In the claims, unless otherwise qualified :the word "can" signifies a hollow, non-rectangular article, open or sealed, of metal, dense plastic or glass; and "plastic" means any natural or synthetic plastic; "gaseous material" means any pure gas, gaseous mixture, gas-cell-containing foamed plastic, or other insulating material that is mixed with air or other gas.

I claim:

1. A method of making a light-weight, transportable construction member, including the following steps:
   A. placing in the bottom of a mold that is later separable from said member a can-supporting, substantially planar, preformed can-supporting element;
   B. placing on said can-supporting element a plurality of strength-providing cans, each of these cans having: a sidewall; a lower can-end element, fixed to the bottom of said sidewall and resting on the can-supporting element; and an upper can-end plate that has an upwardly open recess;
   C. placing on said upper can-end plates strength-providing network, having mesh sufficiently large for passage of moldable material thru it; and providing means holding at least portions of said network in contact with upper can-end plates;
   D. inserting into the mold, thru said mesh, moldable material in fluent form, capable of setting into can bracing material and adhering to said cans and said can supporting element, sidewall-bracing portion of said material going around and bracing said side walls, and extending above said lower can-end elements and not being above said upper can-end plates other portions of its lodging in said upwardly facing recesses, only that part of said material lodging in said upper can-end recesses extending above said upper can-end plates;
   E. allowing said fluent material to set; and taking from the mold the completed construction member 2. A method as set forth in claim 1, in which: the said cans are used, having openings in their lower ends.

3. A method as set forth in claim 1, wherein said upper can-end portions are exposed to ambient air, and provide between said can-end portions spaces for later reception of tongues of stucco.

4. A method as set forth in claim 1, in which the said moldable material comprises foamed plastic.

5. A method as set forth in claim 1, in which: the means of step C for holding portions of said network in contact with upper can-end plates includes rod-like elements, extending thru said network and into holes in said upper can-end elements, fastening said network and last-named elements together; and the said steps A and B include applying adhesive between said can-supporting element and said lower can-end elements, fastening them together.

6. A method as set forth in claim 1, in which said planar can-supporting element comprises wood; and the method further includes, between steps A and B, the steps of placing a plurality of filler bars inside the mold in juxtaposition with upright elements of the mold and covering edge portions of said can-supporting element each of said filler bars having a length at least equal to the length of a row of cans along said upright mold elements, a width at least equal to the height of the can of said row, and a thickness equal to that of a desired border attachment flange of said construction member the said filler bars excluding said moldable material from said edge portions; and the said step E including removal of said filler bars from above said edge portions, providing border flanges of the construction member, capable of being attached to other members of a composite structure.

* * * * *

UNITED STATES PATENT OFFICE
CERTIFICATE OF CORRECTION

Patent No. 4,050,978　　　　　　Dated September 27, 1977

Inventor(s) Alvin Edward Moore

It is certified that error appears in the above-identified patent and that said Letters Patent are hereby corrected as shown below:

Column 1, line 49, "lane" should be --plane--.

Column 3, line 66, "2" should be --2 3/8--.

Columns 5 & 6 should be deleted and substituted with the attached columns 5 & 6 therefor.

Signed and Sealed this

Fourth Day of April 1978

[SEAL]

Attest:

RUTH C. MASON
Attesting Officer

LUTRELLE F. PARKER
Acting Commissioner of Patents and Trademarks